(12) United States Patent
Hu (10) Patent No.: US 8,763,449 B2
(45) Date of Patent: Jul. 1, 2014

(54) TIRE MONITORING DEVICE AIR BREATHING TUBE

(75) Inventor: Junfeng Hu, Waterdown (CA)

(73) Assignee: 1814393 Ontario Inc., Ontario (CA)

( * ) Notice: Subject to any disclaimer, the term of this patent is extended or adjusted under 35 U.S.C. 154(b) by 112 days.

(21) Appl. No.: 13/604,163

(22) Filed: Sep. 5, 2012

(65) Prior Publication Data

US 2014/0060171 A1    Mar. 6, 2014

(51) Int. Cl.
*B60C 23/02*    (2006.01)
*B60C 23/04*    (2006.01)
*B60C 29/02*    (2006.01)

(52) U.S. Cl.
CPC .............................. *B60C 23/0408* (2013.01); *B60C 29/02* (2013.01)
USPC .................................. 73/146.2; 73/146.5

(58) Field of Classification Search
CPC .. B60C 23/0408; B60C 23/02; B60C 23/0494
USPC .................................................. 73/146–146.8
See application file for complete search history.

(56) References Cited

U.S. PATENT DOCUMENTS

| 4,310,826 | A | 1/1982 | D'Angiolillo |
| 5,844,131 | A | 12/1998 | Gabelmann et al. |
| 6,407,662 | B1 | 6/2002 | Gomez De Sebastian |
| 6,868,717 | B2 | 3/2005 | Koch et al. |
| 6,943,674 | B2 | 9/2005 | Tsai |
| 7,089,147 | B1 | 8/2006 | Chang |
| 7,161,476 | B2 | 1/2007 | Hardman et al. |
| 7,336,162 | B2 | 2/2008 | Stack et al. |
| 7,565,832 | B2 | 7/2009 | Huang |
| 2002/0002862 | A1* | 1/2002 | Bunya et al. ................. 73/146.3 |
| 2003/0209065 | A1* | 11/2003 | Fonteneau ................... 73/146.8 |
| 2005/0092076 | A1* | 5/2005 | Uleski et al. ................. 73/146.8 |
| 2007/0062268 | A1* | 3/2007 | Blossfeld et al. ............ 73/146.8 |
| 2008/0094196 | A1* | 4/2008 | Liao ............................. 340/447 |
| 2009/0199629 | A1 | 8/2009 | Matsumura |
| 2010/0180678 | A1 | 7/2010 | Casner |
| 2010/0288411 | A1 | 11/2010 | Loewe |
| 2012/0222478 | A1* | 9/2012 | Kanenari et al. ............. 73/146.5 |

* cited by examiner

*Primary Examiner* — Andre Allen
(74) *Attorney, Agent, or Firm* — Fraser Clemens Martin & Miller LLC; Thomas J. Krul (57) ABSTRACT

A tire monitoring device includes a housing mounted within a cavity of a tire/wheel assembly. A sensor within the housing senses a condition within the cavity via an open passage in the housing. A hollow first tube extends away from the housing coaxial to an axis of the open passage. The first tube has an internal bore aligned with the open passage, and includes: a first tubular portion having a first cross sectional width; and a second tubular portion having a second cross sectional width smaller than the first cross sectional width. The second tubular portion further has a free end opening positioned in the cavity above a level of a liquid present in the cavity when the tire monitoring device is positioned at a lowest point in the cavity. The opening has a cross sectional width sized to prevent entrance of the liquid past the opening.

26 Claims, 9 Drawing Sheets

TIRE MONITORING DEVICE AIR BREATHING TUBE

FIELD

The present disclosure relates to wireless vehicle tire monitoring systems.

BACKGROUND

This section provides background information related to the present disclosure which is not necessarily prior art.

In some vehicle tires, especially heavy duty off-road vehicles including those used as large dump or hauling trucks, front end loaders, and those used in mining vehicles, a liquid is commonly present inside the tire to assist in cooling the tire/wheel assembly. The liquid can have some or all of the following functions: tire cooling, tire sealing, lubrication, anti-rust or descaling, tire bladder conditioning and the like. It is known to install wireless tire monitoring sensors having a sensing chip that can sense tire chamber conditions and also wirelessly transmit data such as tire pressure and temperature to remote receivers, for example receivers located in a vehicle cab or to further remote monitoring systems. Present wireless air pressure monitoring sensors have a short air passage for communication between the air inside the tire chamber and the sensing chip. It is possible for the liquid in the tire chamber to submerge the tire pressure monitoring sensor or splash on it and thus have the liquid enter the sensor through the breathing hole. Entrance of the cooling liquid can clog the air breathing hole and/or damage the internal electronic unit. If the air pressure monitoring sensor is submerged in the liquid, if additional air is pumped into the tire, the increased air pressure forces the liquid into the air pressure monitoring sensor through the breathing hole. Further, even if the air pressure monitoring sensor is not submerged in the liquid, when the tire rotates the liquid can be splashed on the air pressure monitoring sensor and enter the air pressure monitoring sensor.

U.S. Pat. No. 7,538,660 discloses a communication hole 71 and a U-shaped pipe 580 intended to prevent entrance of a tire repair agent. These features do not prevent entrance of liquid into the communication hole, particularly if the pipe 580 is submerged in a liquid. U.S. Pat. No. 8,138,904 discloses branched path sections and wall sections intended to minimize entrance of fluids by providing direct impingement of incoming fluid against the perpendicularly configured wall sections and the tortuous path of branched path sections. These features also do not prevent the entrance of liquid if the sensor is submerged.

SUMMARY

This section provides a general summary of the disclosure, and is not a comprehensive disclosure of its full scope or all of its features.

According to several aspects, a tire monitoring device includes a housing mounted within a cavity of a tire/wheel assembly. A sensor is positioned within the housing adapted to sense a condition within the cavity of the tire/wheel assembly via an open passage created in the housing. A hollow linearly extending breathing tube is connected to the housing having an internal bore aligned with the open passage. The breathing tube includes an opening at a free end. The opening is sized to prevent entrance of a liquid present in the cavity from entering the opening.

According to other aspects, a tire monitoring device includes a housing mounted within a cavity of a tire/wheel assembly. A sensor is positioned within the housing adapted to sense a condition within the cavity via an open passage created in the housing. A hollow first tube extends away from the housing coaxial to an axis of the open passage, the first tube having an internal bore aligned with the open passage. The first tube includes: a first tubular portion having a first cross sectional width; and a second tubular portion having a second cross sectional width smaller than the first cross sectional width. The second tubular portion further has an opening at a free end. The opening is positioned in the cavity above a level of a liquid present in the cavity when the tire monitoring device is positioned at a lowest point in the cavity, and the opening has a cross sectional width sized to prevent entrance of the liquid past the opening.

According to further aspects, a tire monitoring system includes a tire/wheel assembly having a liquid occupying a portion of an internal cavity of the tire/wheel assembly. The liquid pools in the internal cavity when the tire/wheel assembly is in a non-rotating condition. A tire monitoring device positioned in the internal cavity includes: a housing mounted to a tire wall; a hollow breathing tube connected to the housing and aligned with the open passage; and a hollow linearly extending breathing tube connected to the housing having an internal bore aligned with the open passage. The breathing tube includes an opening at a free end. The opening is sized to prevent entrance of a liquid present in the cavity from entering the opening. A total length of the breathing tube is predetermined to position the opening of the breathing tube freely away from a surface of the liquid created by pooling of the liquid when the tire/wheel assembly is stationary and the housing is positioned at a lowest elevation of the internal cavity.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

A wireless transmission tire system such as a tire pressure monitoring system (TPMS) of the present disclosure can be mounted to an inner side or tread wall, or to the metal wheel of each of the tires of a vehicle, typically large commercial vehicle tires used such as in mining dump trucks, heavy machinery such as front end loaders, and hauling trucks. A tire pressure monitor as used herein broadly also includes temperature, motion, and other similar sensors that are commonly used to provide remote transmission of the operating conditions of vehicle tires. The breathing tube of the present disclosure is an axially elongated tube connected to the body or wall of the monitoring device that acts to minimize or prevent entry of fluid/contaminants that are present in the inner space of the tire from entering the inlet pressure port of the monitoring device.

Figure 1:
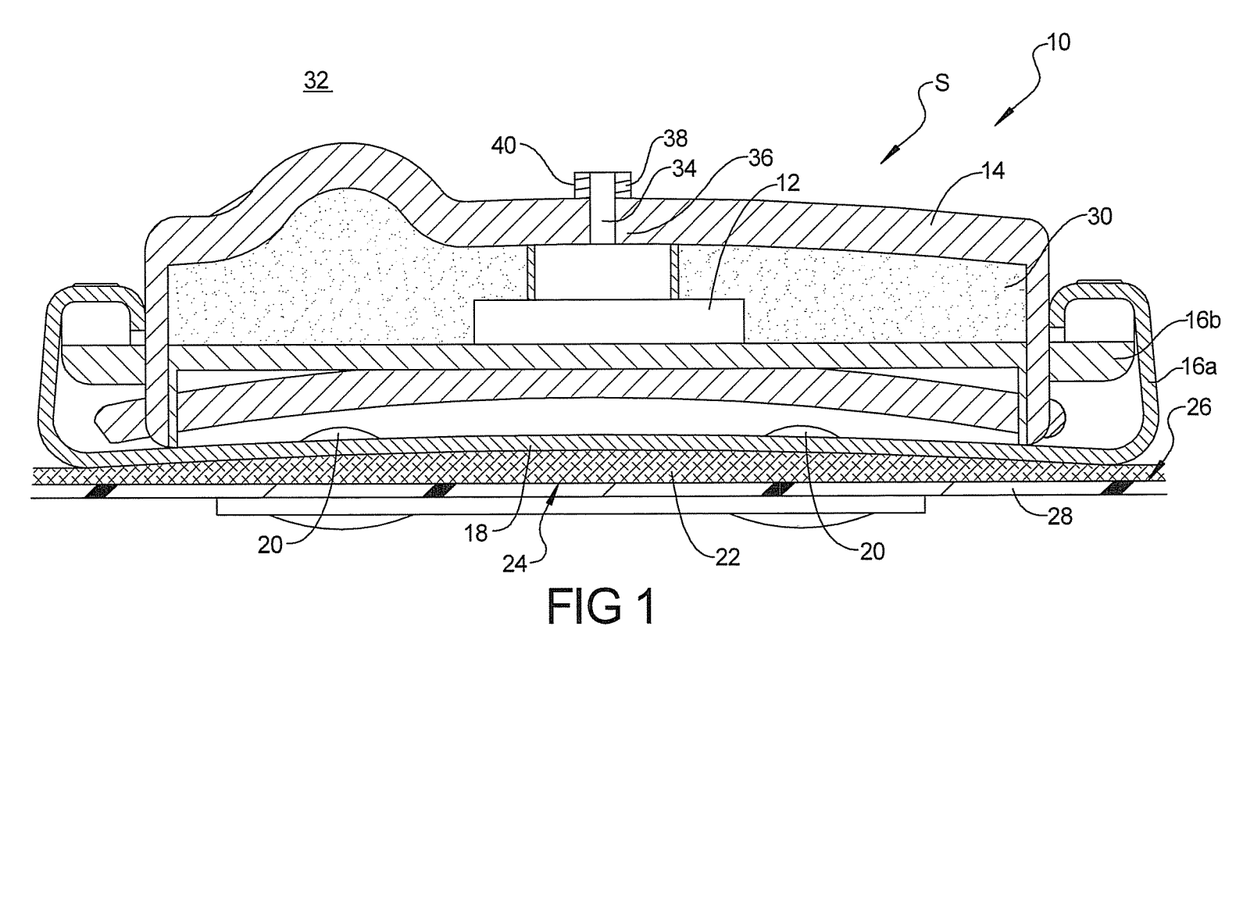
FIG. 1 is a cross sectional front elevational view of a tire monitor of the present disclosure taken at section 1 of FIG. 9.

Referring to FIG. 1, a monitoring system "S" consists of a tire monitoring device 10 having a sensor 12 positioned in a body or housing 14. The housing 14 can be mounted using a bracket assembly having brackets 16a, 16b connected at a bracket body 18 by fasteners 20 to a resilient material "patch" or mounting pad 22 that is in turn fixed or releasably connected such as by an adhesive layer 24 or by thermal bonding to an inner wall 26 of a tire 28. According to several aspects, inner wall 26 is an inner tread wall of tire 28.

The sensor 12 is positioned in an inner cavity 30 of the housing 14 to protect the sensor 12. In order to sense the conditions of an inner volume 32 of the tire 28, an open passage 34 is created through a wall 36 of housing 14. In order to mount a member acting to prevent fluid such as water, coolant, or contaminants that are present in inner volume 32 from entering cavity 30 of tire monitoring device 10, a stub 38 is attached to wall 36 in coaxial alignment with open passage 34. Stub 38 may include external threads 40.

Referring to FIG. 2 and again to FIG. 1, tire monitoring device 10 may be fixed to an inner tread wall of tire 28; therefore, a coolant liquid 42 present in the inner volume 32 of tire 28 can at least partially submerge tire monitoring device 10 during a portion of a rotational cycle of tire 28 such as when the tire 28 is stationary and tire monitoring device 10 is at a lowest elevation of tire 28. Under some operating conditions, liquid 42 can cover or submerge tire monitoring device 10 such that liquid 42 could enter open passage 34 and cavity 30 to contact sensor 12. Presence of liquid 42 in contact with sensor 12 can alter the pressure signal created by sensor 12 and/or damage sensor 12. In order to prevent this occurrence, a breathing tube 44 is connected to and extends away from stub 38. Breathing tube 44 includes a first tubular portion 46 connected to stub 38, and according to several aspects a smaller cross section second tubular portion 48 extending from first tubular portion 46, and defining a free or open end of breathing tube 44. Breathing tube 44 has a first internal bore 50 which is in communication through open passage 34 with cavity 30. According to several aspects, a length of breathing tube 44 is predetermined to position at least second tubular portion 48 extending above a surface 52 defining a maximum expected column height of liquid 42 in tire 28. According to other aspects, breathing tube 44 is designed to have at least a portion of first tubular portion 46 extending above surface 52.

Figure 2:
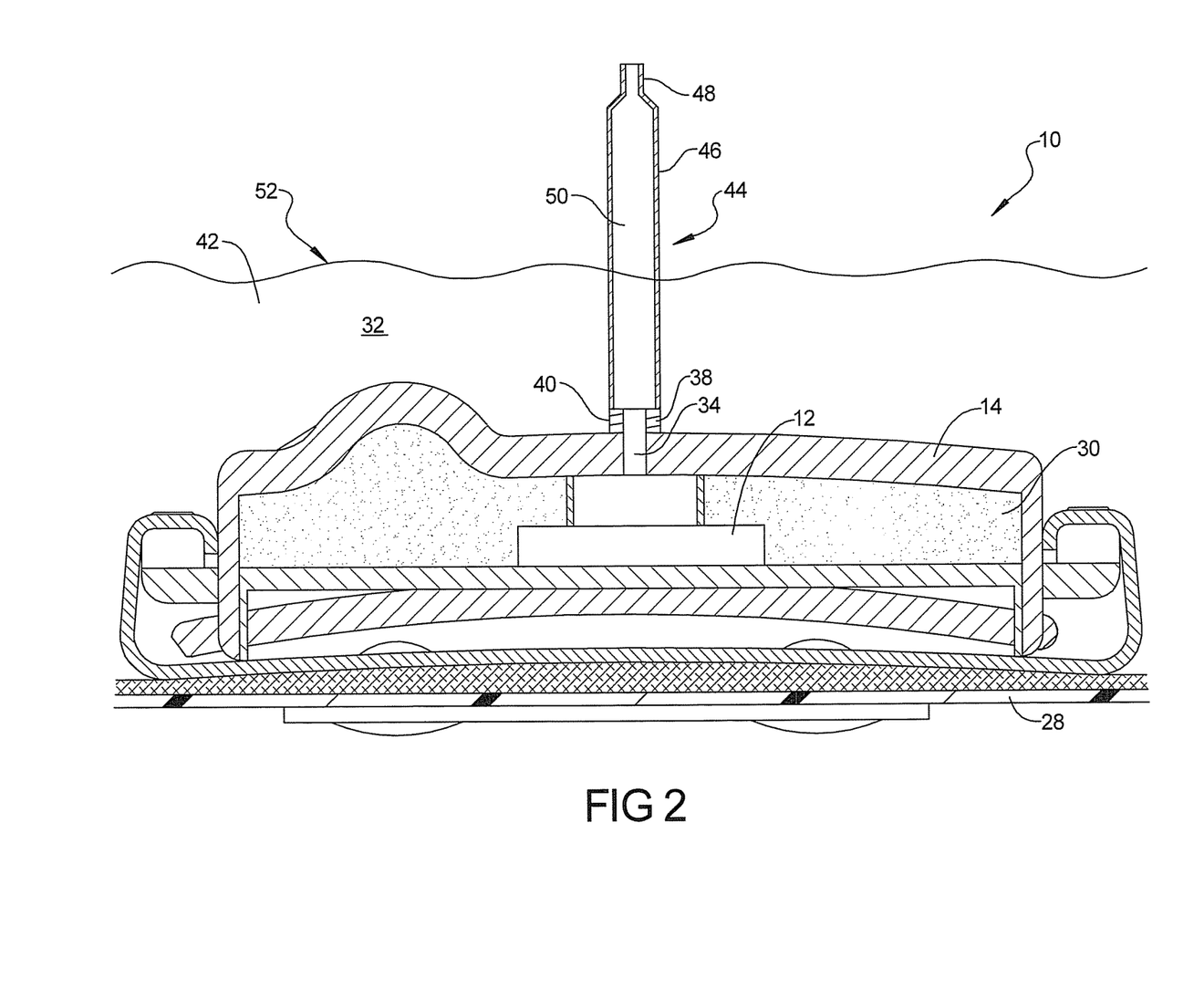
FIG. 2 is a cross sectional front elevational view similar to FIG. 1 further showing installation of a breathing tube.

Referring to FIG. 3 and again to FIGS. 1 and 2, first and second tubular portions 46, 48 can have a circular, oval, rectangular, triangular, or other geometric shaped cross section having a hollow, longitudinally and linearly extending bore. According to several aspects, a circular cross section is shown, but is not limiting. First tubular portion 46 of breathing tube 44 includes first internal bore 50 defining a first cross sectional width "A" which corresponds to a diameter when first tubular portion 46 has a circular cross section. Second tubular portion 48 integrally extends from first tubular portion 46 at a free end of breathing tube 44 and includes a second internal bore 54 defining a second cross sectional width "B". Breathing tube 44 extends linearly, and has a longitudinal central axis 56 that is coaxially aligned with the centerline of open passage 34 when breathing tube 44 is installed. A mouth or opening 58 of second tubular portion 48 is located at and defines a free end of breathing tube 44 opening into inner volume 32 of tire 28. Under normal operating conditions of tire monitoring device 10, the pressure within first internal bore 50 equals the pressure within inner volume 32 of the tire 28, therefore the air inside breathing tube 44 is not pushed/compressed by liquid 42, thus liquid 42 will be blocked by the air inside breathing tube 44 from entering the tube. Further, because the opening 58 is small, surface tension of liquid 42 will further prevent the liquid 42 from entering the breathing tube 44. In addition, a material such as grease or a similar material can be applied to a tube surface proximate to the opening 58 of breathing tube 44 to prevent accumulation of liquid 42 at opening 58, and thereby prevent entrance of liquid 42 into opening 58. If in any case there is any liquid present at the opening 58 of breathing tube 44, as pressure within inner volume 32 reduces naturally over time, as all tires do, this liquid will be forced out as the greater pressure within breathing tube 44 forces air out to match the reducing pressure of inner volume 32.

Figure 3:
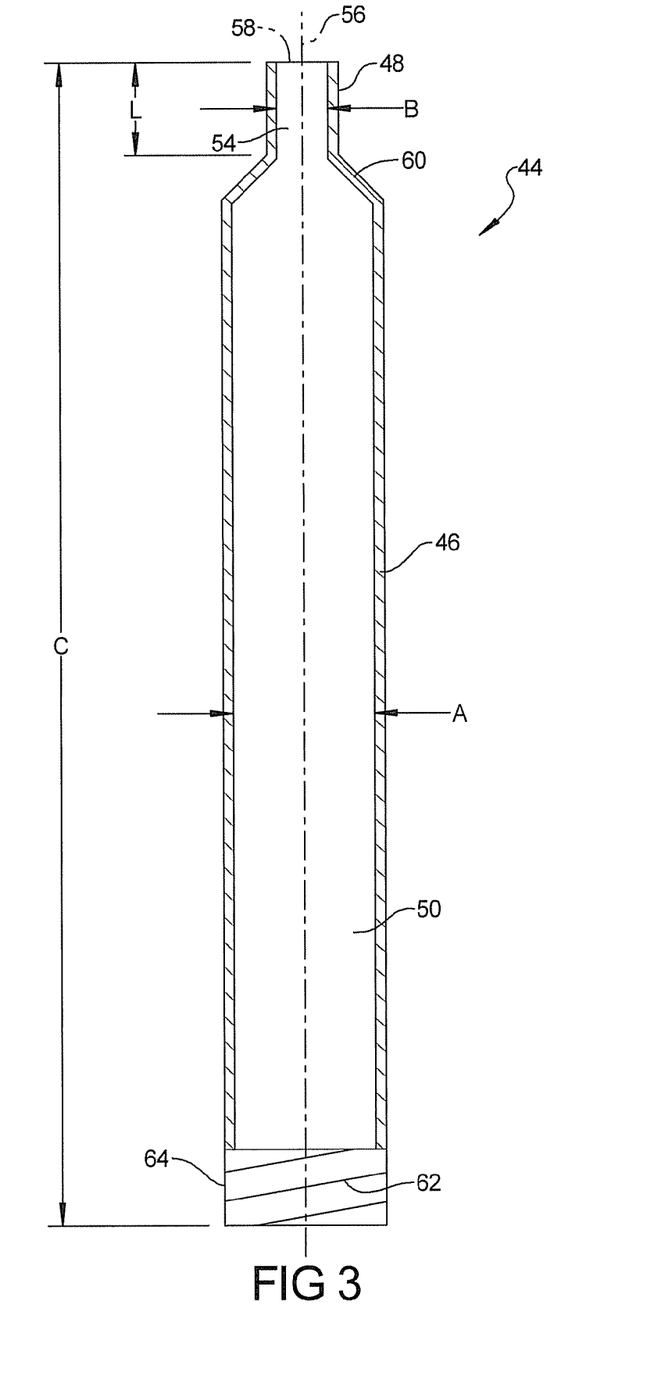
FIG. 3 is a cross sectional front elevational view of a first aspect of a breathing tube of the present disclosure.

According to several aspects, second cross sectional width "B" is 3 mm or less and is smaller than first cross sectional width "A", thereby allowing the natural adhesion and cohesion properties of molecules of the liquid 42 to be used to prevent entrance of the liquid 42 through opening 58. Cohesion of the liquid molecules acts to bond the water molecules together at opening 58, while adhesion of the bonded water molecules to the inner wall of opening 58 prevents entrance of the liquid. These adhesion and cohesion forces with a selectively sized opening 58 act to trap liquid 42 at the opening 58 having the predetermined second cross sectional width "B", thereby preventing liquid 42 from entering first internal bore 50 of breathing tube 44. In further aspects, the second cross sectional width "B" is approximately 2 mm or less.

During those operating times when the tire is not rotating and liquid 42 can settle or pool at the bottom inner tread wall of tire 28, tire monitoring device 10 can be partially or completely submerged in the pool of liquid 42. Breathing tube 44 is therefore provided having a total length "C" which positions opening 58 above or free of the surface 52 of liquid 42. Total length "C" can be predetermined by determining a maximum volume of cooling liquid 42 recommended by the tire manufacturer or tire liquid manufacturer, and using the dimensions of the tire 28 to calculate where surface 52 is anticipated. The second tubular portion 48 has a length "L" which can range from substantially zero to approximately the total length "C", for example when first cross sectional width "A" is provided only where necessary to provide connection to stub 38. According to several aspects, an end portion 60 connects first and second tubular portions 46, 48. End portion 60 can be conical-shaped (shown), or concave shaped, convex shaped, rounded, or flat (oriented transverse to longitudinal central axis 56).

With continuing reference to FIG. 3 and again to FIGS. 1 and 2, internal threads 62 can be provided proximate to a connecting end 64 of first tubular portion 46. Internal threads 62 are coupled with external threads 40 of stub 38. According to further aspects, external threads 40 and internal threads 62 can be omitted and breathing tube 44 can be fixed to stub 38 at connecting end 64, for example by an adhesive, a solder connection, a C-ring snap connection, or a similar fixing method. For example, the threaded connection is not used when other geometric shapes for breathing tube 44 and stub 38 are used, for example rectangular, oval, and the like. Connecting end 64 can therefore have a smooth internal bore to slidably connect to a roughened or smooth surface of stub 38 in these aspects. In a further aspect, breathing tube 44 can be directly connected to wall 36 or inserted into a mating internal counter-bore created in wall 36 such that stub 38 can therefore be eliminated entirely as will be described in reference to FIG. 10.

Figure 4:
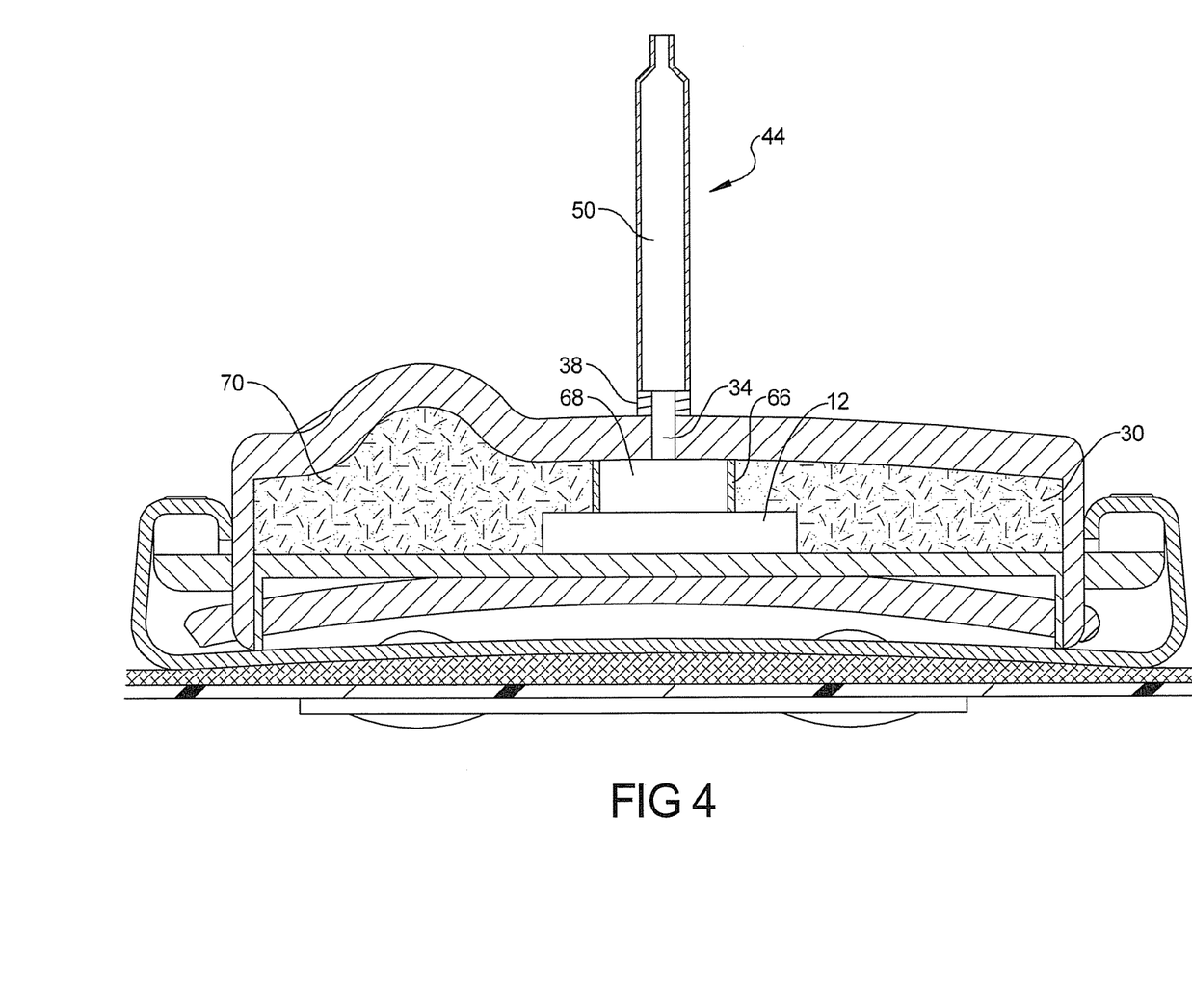
FIG. 4 is a cross sectional front elevational view similar to FIG. 1 further showing an internal air chamber isolating the sensor and open passage from an encapsulation material in the body.

Referring to FIG. 4, a chamber wall 66 can be provided in the inner cavity 30 of housing 14. Chamber wall 66 creates a sealed communication passage 68 between open passage 34 and sensor 12. Chamber wall 66 isolates sensor 12 from an encapsulation material 70 which is normally used to fill the inner cavity 30 and which also helps isolate sensor 12 from fluid and/or contaminants that could enter or be present in housing 14.

Referring to FIG. 5 and again to FIG. 3, according to additional aspects, a breathing tube 72 can be used in place of breathing tube 44. Breathing tube 72 includes a tubular body 74 having an end portion 76. End portion 76, similar to end portion 60 can be concave shaped (shown), conical-shaped, convex shaped, rounded, or flat (oriented transverse to a tube longitudinal central axis). A mouth or opening 78 is similar in size to cross sectional width "B" of opening 58. The shape of end portion 76 functions similarly to end portion 60 to transition from an outer body wall of tubular body 74 to a breathing tube end 80 proximate to the opening 78. A connecting end 82 can be similarly configured to connecting end 64 of breathing tube 44.

Figure 5:
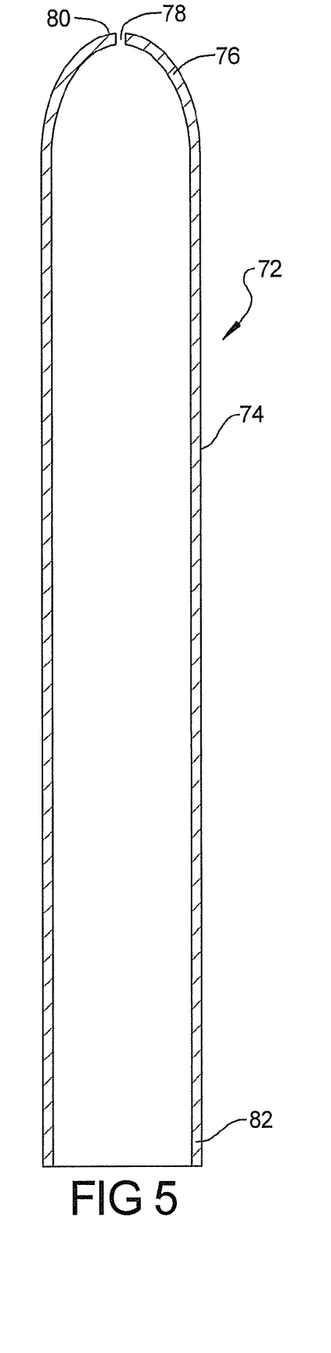
FIG. 5 is a cross sectional front elevational view of a another aspect of a breathing tube of the present disclosure.

Referring to FIG. 6 and again to FIGS. 3 and 5, according to further aspects, a breathing tube 84 can be substituted for either breathing tube 44 or breathing tube 72. Breathing tube 84 defines a "tube-within-a-tube" design that provides an additional level of liquid isolation. Breathing tube 84 is shown in several aspects having a first tubular portion or outer tube 86 which in the embodiment shown is similar to breathing tube 72 in geometry, having outer tube 86 integrally connected to a curved or oval shaped end portion 88. Outer tube 86 can also be provided in any other geometric shape desired. In addition, breathing tube 84 can be made using any combination of breathing tube 44 or breathing tube 72 for the inner and/or outer tubes as a tube-within-a-tube design. Curved or oval shaped end portion 88 has a continuously reducing cross sectional width which acts similarly to cross sectional width "B". A mouth or first opening 90 is similar in size to opening 58 and has a continuously reducing cross sectional width which acts similarly to cross sectional width "B". End portion 88 can also be shaped similar to any of the shapes provided for end portions 60 or 76. Liquid which may enter first opening 90 is received in an internal bore 92 of outer tube 86 and will initially adhere to an inner wall 94 of outer tube 86. If a sufficient quantity of liquid enters outer tube 86, it will collect proximate to a collection end 96 which is sealed by a collection end wall 98 from open passage 34. Collection end wall 98 can be oriented perpendicularly to inner wall 94 and can be connected to or integrally joined to a second tubular portion or inner tube 100.

Figure 6:
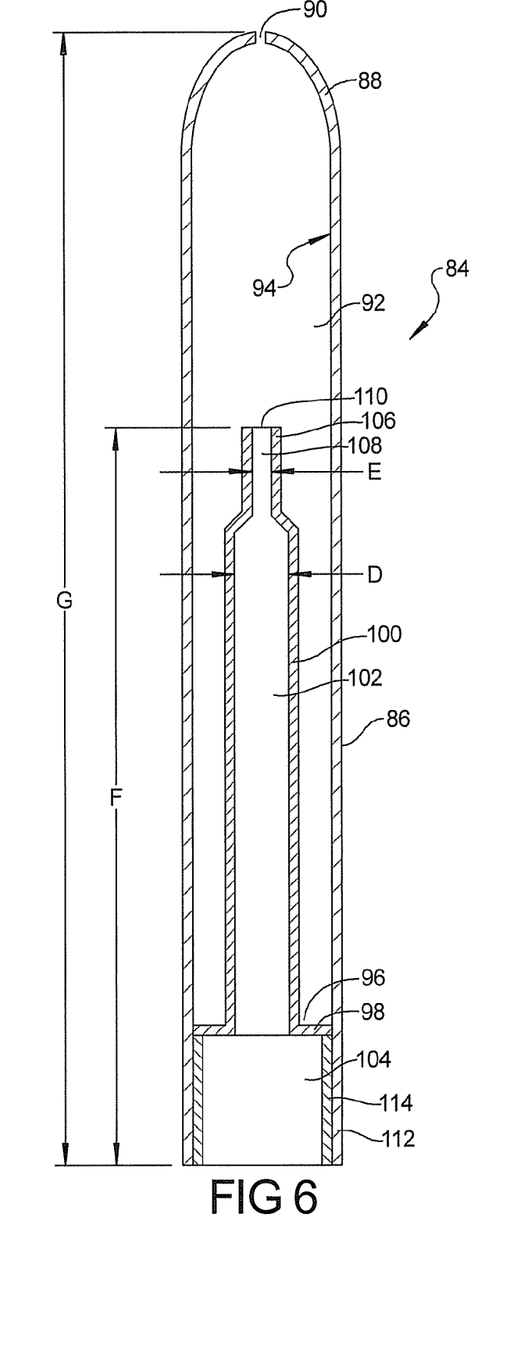
FIG. 6 is a cross sectional front elevational view of still another aspect of a breathing tube of the present disclosure.

Second tubular portion or inner tube 100, according to several aspects, is similar in geometry to breathing tube 44, however any geometry can be selected. Inner tube 100 has a cross sectional width "D" smaller than cross sectional width "A" of breathing tube 44 such that clearance is provided between inner tube 100 and the inner wall 94. Inner tube 100 extends through collection end wall 98 such that an inner bore 102 of inner tube 100 communicates with an end cavity 104 of breathing tube 84, whereas internal bore 92 is isolated from end cavity 104 by collection end wall 98. A second portion 106 of inner tube 100 is similar in design and function to second tubular portion 48 of breathing tube 44 and includes a cross sectional width "E" which is smaller than cross sectional width "D". A mouth or second opening 110 of second portion 106 is elevated with respect to collection end wall 98 such that liquid pooling at collection end 96 is isolated from second opening 110.

With continuing reference to FIG. 6 and again to FIGS. 1-4, the tube-within-a-tube design provided by inner tube 100 and outer tube 86 provides a double opening (first opening 90 and second opening 110) that liquid must traverse to enter open passage 34. Because each of the first opening 90 and second opening 110 have a reduced cross sectional width compared to outer tube 86 and inner tube 100, which as noted herein is approximately 3 mm or less, a double barrier or double restriction to liquid passage is provided for breathing tube 84. According to several aspects a length "F" including inner tube 100 and a connecting end 112 is shorter than a total length "G" of breathing tube 84. Similar to breathing tubes 44 and 72, breathing tube 84 can also include internal threads 114 in end cavity 104 adapted to couple with the threads 40 of stub 38.

Referring to FIG. 7 and again to FIGS. 1 and 3, tire monitoring system "S" having tire monitoring device 10 can be used for sensing and monitoring tire pressure or other operating conditions within an inner volume or chamber defined by any vehicle tire/wheel assembly, and particularly in slowly rotating tire/wheel assemblies such as a front steerable tire/wheel assembly 116 or the rear tire/wheel assemblies 118 of a large heavy material hauling machine 120. The wireless transmission signals from tire pressure sensor 12 can be received in a cab 122 of hauling machine 120 and monitored by the occupant of cab 122.

Figure 7:
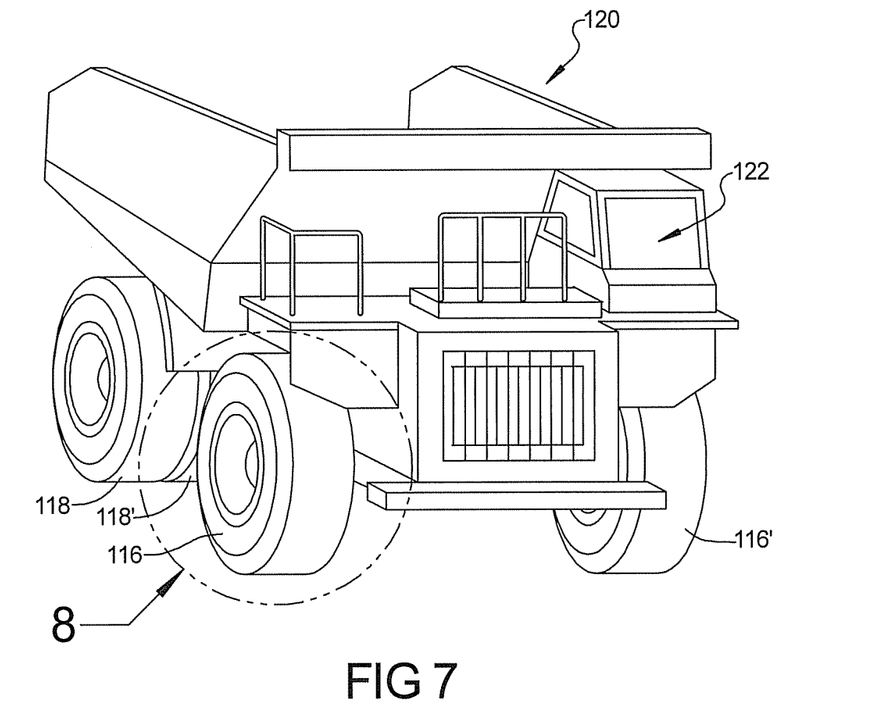
FIG. 7 is a front right perspective view of a vehicle having the system of FIG. 1.
Figure 8:
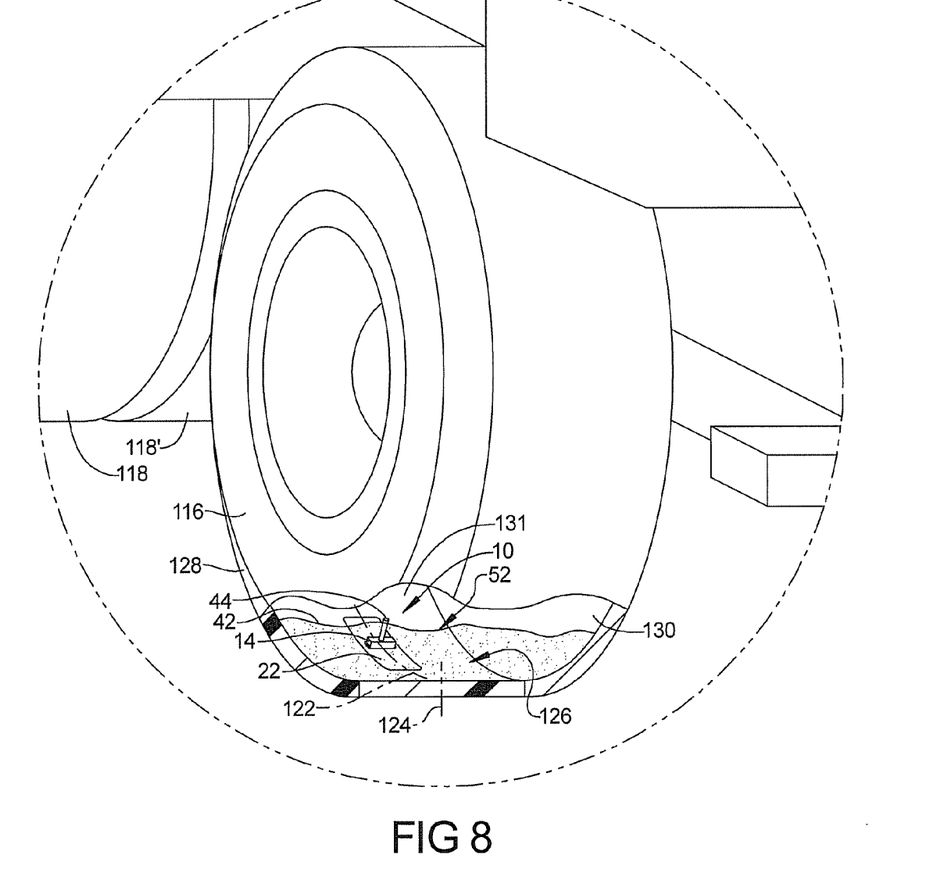
FIG. 8 is a partial cross sectional front right perspective view of area 8 of FIG. 7.

Referring to FIG. 8 and again to FIG. 7, an exemplary installation of tire monitoring device 10 in tire/wheel assembly 116 has housing 14 perpendicularly oriented to a radial centerline 124 of mounting pad 22 and approximately centered on a tire inner tread wall 126. This orientation maximizes the spacing between tire monitoring device 10 and either of opposed first or second tire side walls 128, 130. Because deflection of the first and second side walls 128, 130 continuously varies during tire rotation and when front tire/wheel assembly 116 (or rear tire/wheel assembly 118) encounters an object, this positioning of tire monitoring device 10 minimizes deflection which could affect the bond at mounting pad 22. The breathing tube 44 shown (any of breathing tubes 44, 72 or 84 can be used) has opening 58 in communication with an inner volume or cavity 131 of the tire/wheel assembly. The breathing tube 44 extends axially away from housing 14 to position opening 58 above the surface 52 of, and therefore outside of, the volume of liquid 42 in a condition anticipated to provide the maximum liquid height, i.e., when tire monitoring device 10 is positioned at the lowest point of front tire/wheel assembly 116 (or rear tire/wheel assembly 118) where liquid 42 can "pool" at the inner bottom of the tire tread wall. Surface 52 is expected to be at a maximum height when the tire/wheel assembly is stopped (non-rotating), allowing maximum pooling of liquid 42. At other rotational positions of tire/wheel assembly 116, the inlet opening cross sectional width "B" of the breathing tube selected (44, 72, 84), which is limited to 3 mm or less, will prevent entrance of liquid 42 into tire monitoring device 10, as previously described herein.

Figure 9:
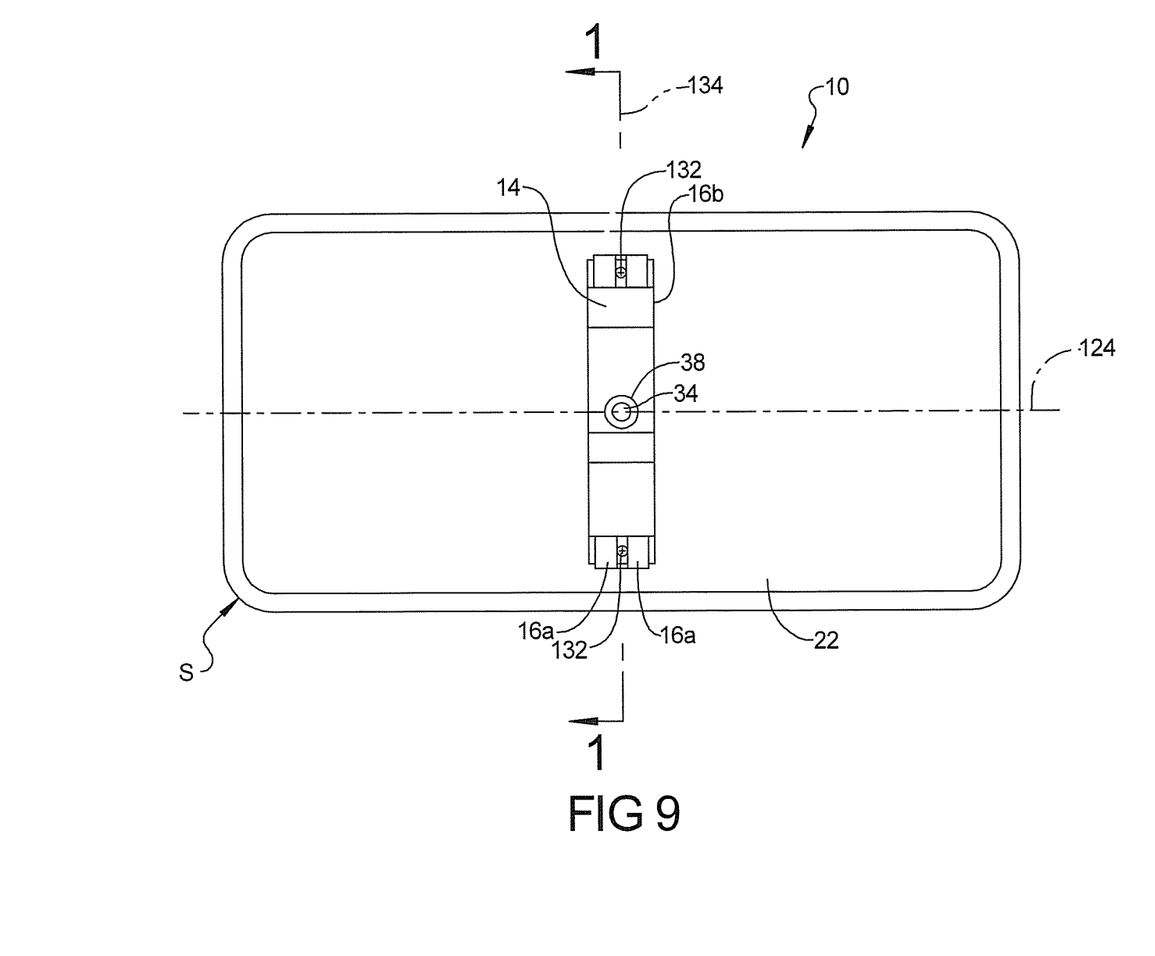
FIG. 9 is a top plan view of the tire monitor of the present disclosure on its mounting pad.

Referring to FIG. 9 and again to FIGS. 1-8, tire monitoring system "S", having tire monitoring device 10, produces an electric output signal from sensor 12 indicating a condition such as a tire pressure of front or rear tire/wheel assembly 116, 118. Tire monitoring device 10 is releasably mounted using fasteners 132 to brackets 16a, 16b. Tire monitoring device 10 is fixed to mounting pad 22 such that a longitudinal axis 134 of housing 14 is oriented transverse to radial centerline 124 of mounting pad 22 which is subsequently aligned with a radial centerline of the tire. Tire monitoring device 10 is shown prior to installation of any of the breathing tubes 44, 72, or 84.

According to other aspects, tire monitoring device 10 includes housing 14 mounted within cavity 131 of tire/wheel assembly 116, 118. Sensor 12 positioned within the housing 14 is adapted to sense a condition within the cavity 131 via open passage 34 created in the housing. Hollow first breathing tube 44 extends away from the housing 14 coaxial to axis 56 of the first breathing tube 44 and open passage 34. The first breathing tube 44 has first internal bore 50 aligned with the open passage 34. The first breathing tube 44 includes: first tubular portion 46 having first cross sectional width "A" and second tubular portion 48 having second cross sectional width "B" which is smaller than the first cross sectional width "A". The second tubular portion 48 has a length "L". The second tubular portion 48 further has opening 58 at the free end, the opening 58 sized to prevent entrance of liquid 42 present in the cavity 30 from entering the opening 58.

Figure 10:
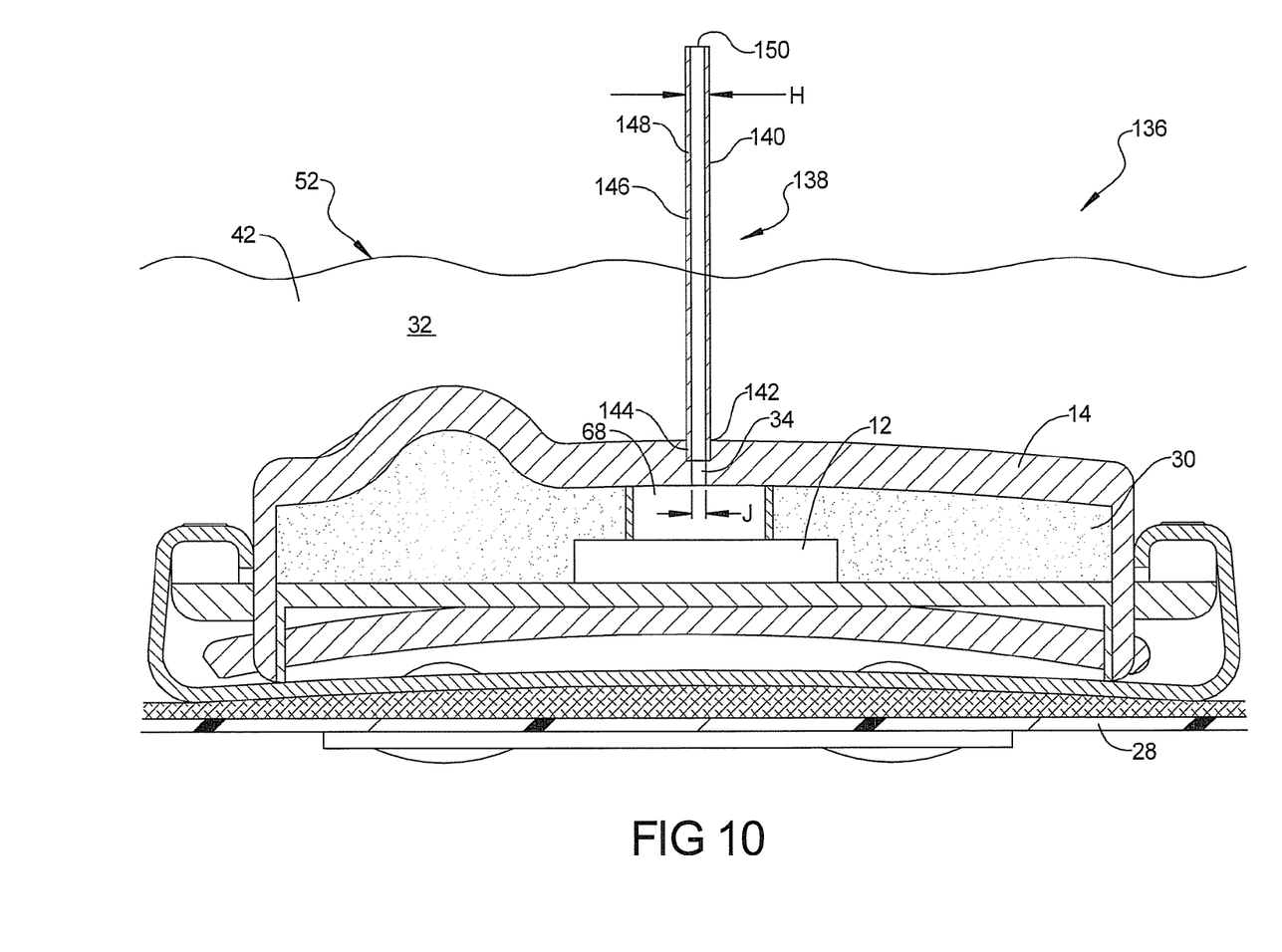
FIG. 10 is a cross sectional front elevational view similar to FIG. 1 of another tire monitoring device embodiment having a continuous diameter breathing tube.

Referring to FIG. 10, a tire monitoring device 136 is modified from tire monitoring device 10 to include a breathing tube 140 having a continuous inner bore diameter "H" that can be substantially equal to a passage diameter "J" of open passage 34. Breathing tube 140 includes a first end 142 which is received in a cavity or counterbore 144 created in housing 14, such that breathing tube first end 142 can be externally threaded to be releasably received in counterbore 144, or can be fixedly connected to counterbore 144 using for example an adhesive. A continuous bore 146 of breathing tube 140 extends throughout a length of breathing tube 146 to a free end 148 having an opening 150, which extends above the surface 52 of liquid 42 when tire monitoring device 136 is positioned at the bottom position of the tire in a tire non-rotating operating condition.

Tire monitoring device air breathing tubes and the systems created by their use provide several advantages. These include: (1) a monitoring system "S" having tire monitoring device 10, 136 positioned within a tire that includes a breathing tube connected to a pressure or sensing port such that the breathing tube extends out of an area or zone where a liquid in the tire may collect and/or submerge the tire monitor; (2) the breathing tube for tire monitoring device 10 having different first and second cross sectional widths, the second cross sectional width at the outer entrance sized to minimize entrance of liquid or contaminants; (3) a breathing tube for a monitoring device extending a distance in a direct, axial path away from a pressure or entrance port of the sensor such that normal internal pressure within the breathing tube acts to displace fluid or contaminants from the breathing tube; (4) an entrance opening of a breathing tube sized to prevent liquid entrance by the adhesion forces of the liquid and attraction of the liquid to the opening wall; and (5) a tube-within-a-tube aspect that provides a double isolation barrier to the entrance of liquid into the tire monitor.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A tire monitoring device, comprising:
a housing mounted within a cavity of a tire/wheel assembly;
a sensor positioned within the housing adapted to sense a condition within the cavity of the tire/wheel assembly via an open passage created in the housing;
a hollow linearly extending breathing tube connected to the housing having an internal bore aligned with the open passage, the breathing tube including an opening at a free end, the opening sized to prevent entrance of a liquid present in the cavity from entering the opening.

2. The tire monitoring device of claim 1, wherein the housing further includes a stub at the open passage, the stub having the open passage extending therethrough.

3. The tire monitoring device of claim 2, wherein the breathing tube includes a connecting end adapted to be connected to the stub to releasably connect the breathing tube to the housing.

4. The tire monitoring device of claim 2, wherein the stub includes an external thread adapted to threadingly engage the breathing tube.

5. The tire monitoring device of claim 1, wherein the breathing tube includes an inner tube having the internal bore aligned with the open passage, and the opening at the free end, and an outer tube enclosing the inner tube, the outer tube having a second opening.

6. The tire monitoring device of claim 5, wherein the opening of the inner tube and the second opening of the outer tube each have a cross sectional width of 3 mm or less.

7. The tire monitoring device of claim 1, wherein the breathing tube includes:
a first tubular portion having a first cross sectional width; and
a second tubular portion integrally extending from the first tubular portion and having a second cross sectional width smaller than the first cross sectional width, the free end extending from the second tubular portion.

8. The tire monitoring device of claim 1, wherein the breathing tube is directly and fixedly connected to the housing.

9. The tire monitoring device of claim 1, wherein the breathing tube is directly connected to a counter bore created in the housing.

10. The tire monitoring device of claim 1, wherein the opening is 3 mm or less.

11. The tire monitoring device of claim 1, wherein the breathing tube has a continuous linearly extending internal bore having a constant cross sectional width equaling a cross sectional width of the open passage.

12. The tire monitoring device of claim 1, further including a grease applied to a surface of the breathing tube proximate to the opening acting to prevent accumulation of the liquid at the opening.

13. A tire monitoring device, comprising:
a housing mounted within a cavity of a tire/wheel assembly;
a sensor positioned within the housing adapted to sense a condition within the cavity via an open passage created in the housing;
a hollow first tube extending away from the housing coaxial to an axis of the open passage, the first tube having an internal bore aligned with the open passage, the first tube including:
a first tubular portion having a first cross sectional width; and
a second tubular portion having a second cross sectional width smaller than the first cross sectional width, the second tubular portion further having an opening at a free end, the opening positioned in the cavity above a level of a liquid present in the cavity when the tire monitoring device is positioned at a lowest point in the cavity, and the opening having a cross sectional width sized to prevent entrance of the liquid past the opening.

14. The tire monitoring device of claim 13, further including a hollow second tube connected to the housing and enclosing the first tube, the second tube having an opening with a cross sectional width equal to the cross sectional width of the first tube opening.

15. The tire monitoring device of claim 14, further including:
an internal bore of the second tube defined by an inner wall of the second tube; and
a collection end of the internal bore.

16. The tire monitoring device of claim 15, wherein the collection end of the internal bore is sealed by a collection end wall from the open passage such that the liquid entering the second tube opening into the internal bore of the second tube initially adheres to the inner wall of the second tube before subsequently collecting proximate to the collection end of the internal bore and therefore is prevented from entering the open passage by the collection end wall.

17. The tire monitoring device of claim 16, wherein the first tube extends through the collection end wall such that an inner bore of the first tube communicates with an end cavity of the second tube.

18. The tire monitoring device of claim 16, wherein the second tube opening is elevated with respect to both the collection end wall and the first tube opening such that the liquid when pooling at the collection end is isolated from the first tube opening.

19. The tire monitoring device of claim 16, wherein the second tube includes a first tube portion and an integrally connected oval shaped end portion, the oval shaped end portion having a continuously reducing cross sectional width between the first tube portion and the opening of the second tube.

20. The tire monitoring device of claim 14, wherein the first tube includes a tubular portion having a cross sectional width smaller than a cross sectional width of the second tube such that a clearance is provided between the first tube and the second tube.

21. The tire monitoring device of claim 13, wherein the opening of the second tube is coaxially aligned with the opening of the first tube.

22. The tire monitoring device of claim 13, wherein the cross sectional width is 3 mm or less.

23. A tire monitoring system, comprising:
a tire/wheel assembly having a liquid occupying a portion of an internal cavity of the tire/wheel assembly, the liquid pooling in the internal cavity when the tire/wheel assembly is in a non-rotating condition;
a tire monitoring device positioned in the internal cavity, including:
a housing mounted to a tire wall;
a hollow breathing tube connected to the housing and aligned with the open passage; and
a hollow linearly extending breathing tube connected to the housing having an internal bore aligned with the open passage, the breathing tube including an opening at a free end, the opening sized to prevent entrance of a liquid present in the cavity from entering the opening, a total length of the breathing tube predetermined to position the opening of the breathing tube freely away from a surface of the liquid created by pooling of the liquid when the tire/wheel assembly is stationary and the housing is positioned at a lowest elevation of the internal cavity.

24. The tire monitoring system of claim 23, wherein the breathing tube includes:
a first tubular portion having a first cross sectional width; and
a second tubular portion integrally connected to the first tubular portion and having a second cross sectional width smaller than the first cross sectional width.

25. The tire monitoring system of claim 24, wherein the opening is 3 mm or less.

26. The tire monitoring system of claim 23, wherein the tire monitoring device further includes:
a sensor positioned within the housing and adapted to sense a condition within the internal cavity via an open passage created in the housing; and
a chamber wall provided in the inner cavity, the chamber wall creating a sealed communication passage between the open passage and the sensor.

* * * * *